(12) United States Patent
Selberg et al.

(10) Patent No.: US 7,748,030 B1
(45) Date of Patent: Jun. 29, 2010

(54) LICENSING DIGITAL CONTENT USE

(75) Inventors: Erik W. Selberg, Seattle, WA (US); Qin Cai, Sammamish, WA (US); David B. Hedbor, Plano, TX (US); Chelsea C. Krueger, Bellevue, WA (US)

(73) Assignee: RealNetworks, Inc., Seattle, WA (US)

( * ) Notice: Subject to any disclaimer, the term of this patent is extended or adjusted under 35 U.S.C. 154(b) by 1509 days.

(21) Appl. No.: 10/608,278

(22) Filed: Jun. 27, 2003

(51) Int. Cl.
*G06F 17/30* (2006.01)

(52) U.S. Cl. ............... 726/7; 726/2; 705/59; 713/165

(58) Field of Classification Search ............ 726/7, 726/2; 705/50, 52, 59, 71, 1, 54; 380/255, 380/258, 279; 710/200; 707/101, 103 X, 707/9; 713/165–167
See application file for complete search history.

(56) References Cited

U.S. PATENT DOCUMENTS

| | | | | |
|---|---|---|---|---|
| 5,204,897 A | * | 4/1993 | Wyman | 710/200 |
| 5,260,999 A | * | 11/1993 | Wyman | 705/59 |
| 6,108,645 A | * | 8/2000 | Eichstaedt et al. | 707/1 |
| 6,226,618 B1 | * | 5/2001 | Downs et al. | 705/1 |
| 6,418,421 B1 | * | 7/2002 | Hurtado et al. | 705/54 |
| 6,587,837 B1 | * | 7/2003 | Spagna et al. | 705/26 |

* cited by examiner

*Primary Examiner*—Thanhnga B Truong
(74) *Attorney, Agent, or Firm*—Graybeal Jackson LLP (57) ABSTRACT

Systems and methods for packaging, delivery, and use of digital content. In one embodiment, a license matrix is created and used for evaluating the license rights applicable to a requested use of a content item. The license matrix can comprise a plurality of licenses grouped in license chains, and each license can include a set of entitlement rules and a set of grants. A license chain can be associated with an identifier corresponding to a use of content. In another embodiment, it is provided a method of packaging unsecured content for secured delivery over a computer network. In yet another embodiment, a system and method are provided for applying digital management rules to a content item at the time a user requests a use of the content item. In some embodiments, systems and methods allow evaluation of a requested use against a group of licenses to determine the applicable license rights for the requested use.

38 Claims, 8 Drawing Sheets

LICENSING DIGITAL CONTENT USE

BACKGROUND OF THE INVENTION

1. Field of the Invention

The invention generally relates to systems and methods for distribution of digital content over a computer network. More particularly, the invention concerns systems and methods to allow content providers to deliver to consumers secured content subject to digital management rules.

2. Description of the Related Technology

The distribution of digital content ("content") continues to expand as digital content providers ("providers") utilize the Internet as a vehicle for distributing content. Content may be in the form of, for example, video, audio, text, or any combination thereof, which may be accessed or distributed as a single file or as a data stream. As used here, the term "presentation" refers to digital content packaged as audio, video, text, or any combination thereof, for use by digital content consumers ("consumers"). For example, a presentation can be digital content in the form of a musical piece, a picture or image, a movie, a magazine article, an excerpt from a text, etc. As used here, the terms "digital content," "content," "content item," "data," "presentation," and "multi-media presentation" are synonymous unless the use of any one of these terms is otherwise explicitly qualified.

To facilitate the distribution of content, providers often rely on a digital content distributor ("distributor") to host and distribute the content. Typically, the distributor advertises the content and provides access to it over the Internet. Distributors allow providers to focus on producing content, rather than spend their resources handling the technical issues of distributing the content online. Distributors increase consumers' access to content because consumers can obtain varied content from multiple providers merely by accessing a single node on a network, e.g., a Web site.

Additionally, distributors can improve content security for providers that desire to control the access or distribution of their content. Content security refers to techniques for ensuring that electronic data stored in computing devices or transmitted between or among nodes of a network cannot be read, copied, displayed, altered, etc., without proper authorization. Most security measures involve data encryption and passwords. A password is a secret word, key, or phrase that must be used to access content or a system that handles content.

Typically providers desire to control consumer access to presentations. The term "access" refers to a privilege to use presentations in some manner. The term "access control" refers to mechanisms and policies that restrict access to computing resources such as computing devices, digital content, etc. For example, the provider might grant to a consumer read-only access to presentations, meaning that the consumer can view, listen to, or read the presentation but cannot modify, copy, or delete it.

It is common for providers to control access to presentations by using, for example, digital rights management ("DRM") systems. As used here a DRM system refers to devices or techniques for controlling the access and/or the distribution of data, e.g., data circulated via the Internet. Typically, a DRM system protects presentations by either encrypting the data so that only authorized consumers can access it or by marking the presentation with a digital watermark or similar method to prevent free distribution of the presentation. Additionally, usually DRM technologies impose constraints on the use of presentations that correspond to the terms of the agreement between provider, distributor, and consumer.

What is needed in the industry are flexible systems and methods that allow providers to secure their content and configure digital rights management rules to govern the content. These systems and methods should allow providers to offer secured content to consumers without necessarily attaching the DRM rules to any one single piece of content available on a computer network. Thus, the industry needs a system and method that allows application of DRM rules to content at the time of use, rather than at the time of creating or securing the content.

BRIEF DESCRIPTION OF THE DRAWINGS

A digital content protection handling system and related methods will now be described with reference to the following drawings.

DETAILED DESCRIPTION OF CERTAIN INVENTIVE EMBODIMENTS

The aspects, features and advantages of the invention will be better understood by referring to the following detailed description in conjunction with the accompanying drawings. These drawings and the associated description are provided to illustrate embodiments of the invention, and not to limit the scope of the invention.

The systems and methods described below generally allow for the packaging, distribution, and use of content over a computer network, the use of the content being subject to licensing rights. In one embodiment, one such system includes a provider that creates unprotected content presentations for distribution to consumers, a content packaging service that receives the unprotected presentation and enhances it to produce a content package that can be delivered securely over the network, a consumer that requests a particular use of a specific content item, and a license broker that evaluates the use request to determine whether the requested use is allowed under any licenses governing the specific content item and the particular use. In what follows, multiple embodiments of such systems and related methods will be described.

Figure 1:
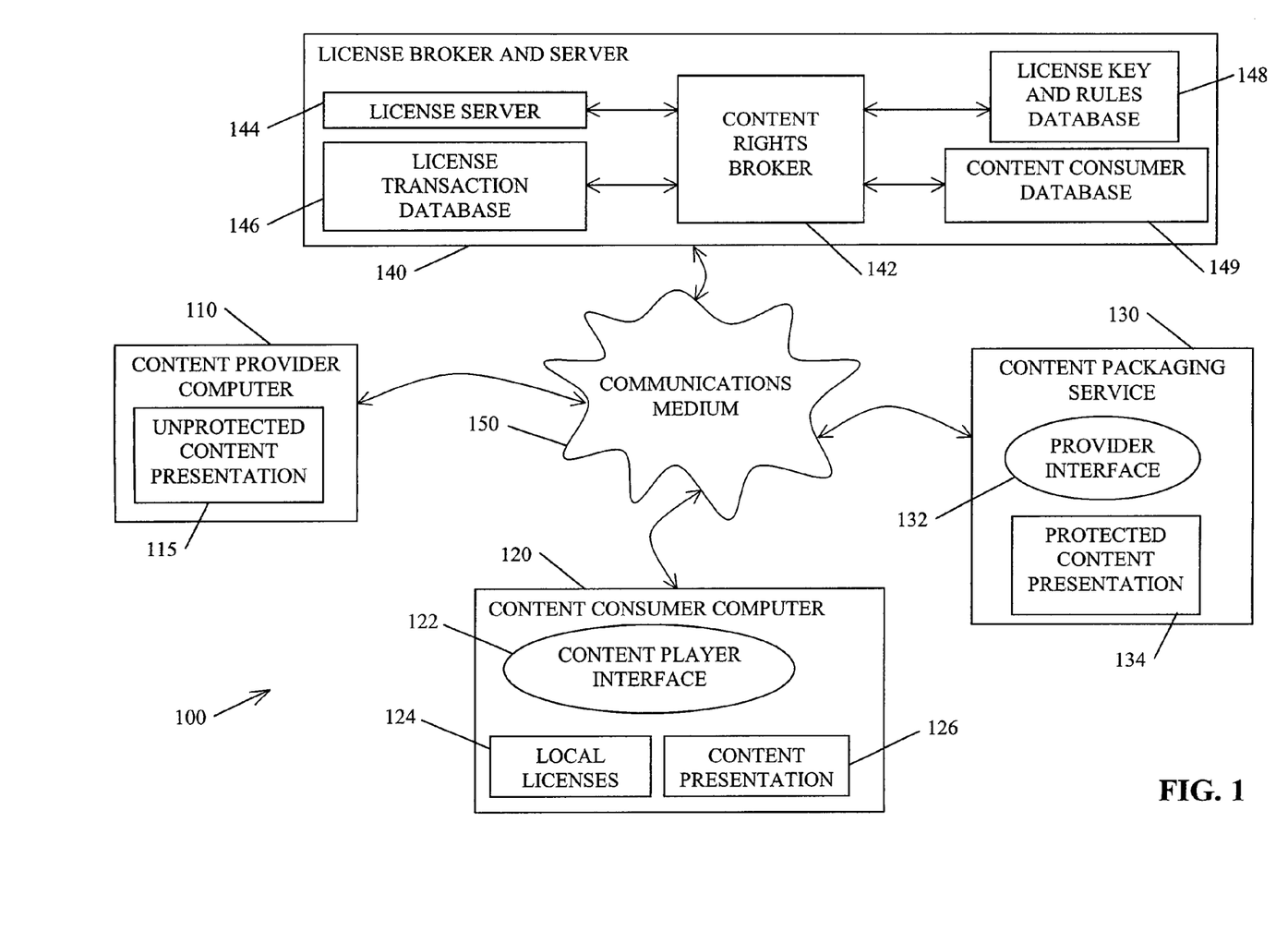
FIG. 1 is a block diagram illustrating an exemplary system, according to one embodiment of the invention, for packaging and distributing digital content subject to licensed consumption.

FIG. 1 is a block diagram illustrating an exemplary system 100 for creating, packaging, distributing, and using digital content in accordance with one embodiment of the invention. The system 100 can include multiple provider computers 110, a content packaging service 130, multiple consumer computers 120, and a license broker and server 140, all of which can be configured to communicate with each other, singly or in combination, via a communications medium 150. Of course, in other embodiments, the system 100 can include a number of provider computers 110, consumer computers 120, packaging service 130, and license broker and server 140 that is different than that shown in FIG. 1.

The communications medium 150 can be any type of electronically connected group of computing devices including, for instance, the following networks: Internet, Intranet, Local Area Networks, or Wide Area Networks. In addition, the connectivity to the communications medium 150 may be, for example, remote modem, Ethernet, Token Ring, Wireless Ethernet, Fiber Distributed Datalink Interface, or Asynchronous Transfer Mode. The communications medium 150 can include network variations such as the public Internet, a private network within the Internet, a secure network within the Internet, a private network, a public network, a value-added network, an Intranet, etc.

In one embodiment of the system 100, the provider computer 110 generally can be any device that allows the storage, indexing, and/or creation of unprotected presentation 115. The provider computer 110 can include computing devices such as a desktop, server, portable, hand-held, set-top, or any other desired type of computer configuration. The unsecured presentation 115 can be, but is not limited to, digital content in any form, including text, audio, video, or multi-media files. For example, presentation 115 can be an MPEG Audio Layer 3 ("MP3") audio file. Of course, the system 100 can include various combinations of protected and unprotected presentations 134 and 115, respectively. As used here, a "content item" refers generally to presentations 115, 126, or 134.

The provider computer 110 can be additionally configured to communicate with the license broker and server 140 and the packaging service 130 over the communications network 150. In one embodiment, the provider computer 110 forwards the unprotected presentation 115 to the packaging service 130, which enhances the unprotected presentation 115 to produce a protected presentation 134 that includes features which provide secured delivery of the presentation 115 to the consumer computer 120. In other embodiments of the system 100, the provider computer 110 can be configured to access the license broker and server 140 to create a license matrix (see FIG. 2) that governs the use of the presentation 134.

The consumer computer 120 can be any computing device configured to store and/or play content items, and to request a use license when appropriate. For example, the consumer computer 120 can be a mobile phone, personal digital assistant, handheld, laptop, desktop, etc., computing device. It should be understood that depending on the context, a reference to a consumer computer 120 can also include an end-user that utilizes the consumer computer 120 to use content. In such instances, for example, the end-user can be identified by an identification number that is different from an identification number assigned to the consumer computer 120.

The consumer computer 120 can be configured to utilize an interface 122 to access presentations 126 or 134. The interface 122 can be, for example, the RealOne™ player by RealNetworks, Inc., of Seattle, Wash., U.S.A. In other embodiments the consumer computer 120 can include various combinations of applications that read the presentations 115 or 134. The consumer computer 120 can additionally be configured to include, or have access to, a local licenses module 124, which includes suitable logic and data to determine whether the consumer computer 120 has the required license rights to use the presentation 126 or 134.

In one embodiment, the packaging service 130 comprises an interface 132 that allows the provider computer 110 to access the packaging service 130. The packaging serve 130 can be configured to receive unprotected presentation 115 from the provider computer 110. The packaging service 130 can manipulate the data of the unprotected presentation 115, for example by encrypting the data, to produce a protected presentation 134. After the packaging service 130 produces the protected presentation 134, it can forward an appropriate notice to the provider computer 110. Of course, in some embodiments of the system 100, the packaging service 130 can be integrated (in the physical and/or logical layers) with the license broker and server 140. In one embodiment, the packaging service 130 couples to the content item a universal resource locator (URL) associated with the license broker and server 140. Hence, when a user attempts to use the content item, the player interface 122 can use the URL to communicate with the license broker and server 140. Of course, the URL can be associated with the content rights broker 142; in which case, the consumer computer 120, or the player interface 122, can locate and communicate with the content rights broker 142.

Still referencing FIG. 1, the license broker and server 140 can include a content rights broker 142 capable of communicating with a license key and rules database 148, content consumer database 149, license transaction database 146, and license server 144. The license key and rules database 148, as will be further described below, stores security data and consumption rules for presentation 134. The consumer database 149 stores data associated with particular consumer computers 120 and/or the end-users of the presentation 134. The license transaction database 146 stores data related to particular use requests, including whether the license broker and server 140 forwarded, granted, or denied a license to the consumer computer 120. Of course, in some embodiments of the system 100, the databases 146, 148, and 149 can be integrated into one or more databases, which, for example, share the same storage devices and/or data structures.

The content rights broker 142 is a module, which can be implemented in hardware and/or software, to evaluate particular requests from consumer computer 120 for use of the presentation 126 or 134. The rights broker 142 can be configured to access anyone one of the license key and rules database 148, consumer database 149, and license transaction database 146 to perform its functions. The license server 144 can be a module configured to forward the appropriate license to the consumer computer 120 if the rights broker 142 determines that the consumer computer 120 qualifies for the license.

The provider computer 110, packaging service 130, and license broker and server 140, each can include a conventional general purpose single- or multi-chip microprocessor (not shown), including but not limited to, a Pentium® processor, Pentium II® processor, Pentium III® processor, Pentium IV® processor, Pentium® Pro processor, a 8051 processor, a MPS® processor, a Power PC® processor, or an ALPHA® processor. In addition, the microprocessor may be any conventional special purpose microprocessor such as a digital signal processor. Additionally, the provider computer 110, packaging service 130, and license broker and server 140, each can include a screen and keyboard for interface with an operator. In another embodiment, the provider computer 110, packaging service 130, and license broker and server 140, each can be pre-configured to perform one or more of the processes described here without operator intervention.

The different components of the system 100 may include software modules stored or executing on the computing devices described above. The modules can comprise various sub-routines, procedures, definitional statements, and macros. The modules are typically separately compiled and linked into a single executable program. Therefore, the following description of modules employed by the components of the system 100 is used for convenience to describe their functionality. Thus, the processes associated with these modules may be arbitrarily redistributed to one of the other modules, combined together in a single module, or made available in a shareable dynamic link library. The software modules may be written in any programming language such as C, C++, BASIC, Pascal, Java, and Fortran and executed by any appropriate operating system. C, C++, BASIC, Pascal, Java, and Fortran are known programming languages for which commercial compilers can be used to create executable code. Below several process will be described that are executed by one or more components of the system 100. These process can be implemented in software modules, firmware, and/or hardware.

In one embodiment, the operation of the system 100 may be described briefly as follows. The provider computer 110 creates, stores, and/or indexes unprotected presentation 115. The provider computer 110 forwards the presentation 115 to the packaging service 130, which receives the presentation 115 and manipulates it to produce a protected presentation 134. The packaging service 130 communicates to the provider computer 110 that the presentation 134 is ready for distribution. The provider computer 110 may then access the license broker and server 140 to create a license matrix (see FIG. 2) to govern the use of the presentation 134. The license broker 140 stores data it receives from the provider computer 110 in the license key and rules database 148 and/or the consumer database 149.

The consumer computer 120 (or an associated end-user) attempts a particular use of a presentation 126 with, for example, the player interface 122. The consumer computer 120 or the interface 122 can be configured to evaluate whether there is a local license 124 that would authorize the requested use of the presentation 126. If there is such a license, the consumer computer 120 may perform the requested use. If there is no local license 124 that authorizes the requested use, in one embodiment the player interface 122 communicates the use request to the rights broker 142, which then determines whether the requested use comes under a license included in a license matrix 200 (see FIG. 2). If the requested use is not authorized by any license of the license matrix 200, in one embodiment the system 100 (through the rights broker 142, for example) can provide the consumer computer 120 with options to purchase licensing rights to perform the requested use. In another embodiment, the system 100 simply communicates to the consumer computer 120 that the requested use is not authorized. In what follows, it is provided a detailed description of several process that can be used in conjunction with the system 100.

Figure 2:
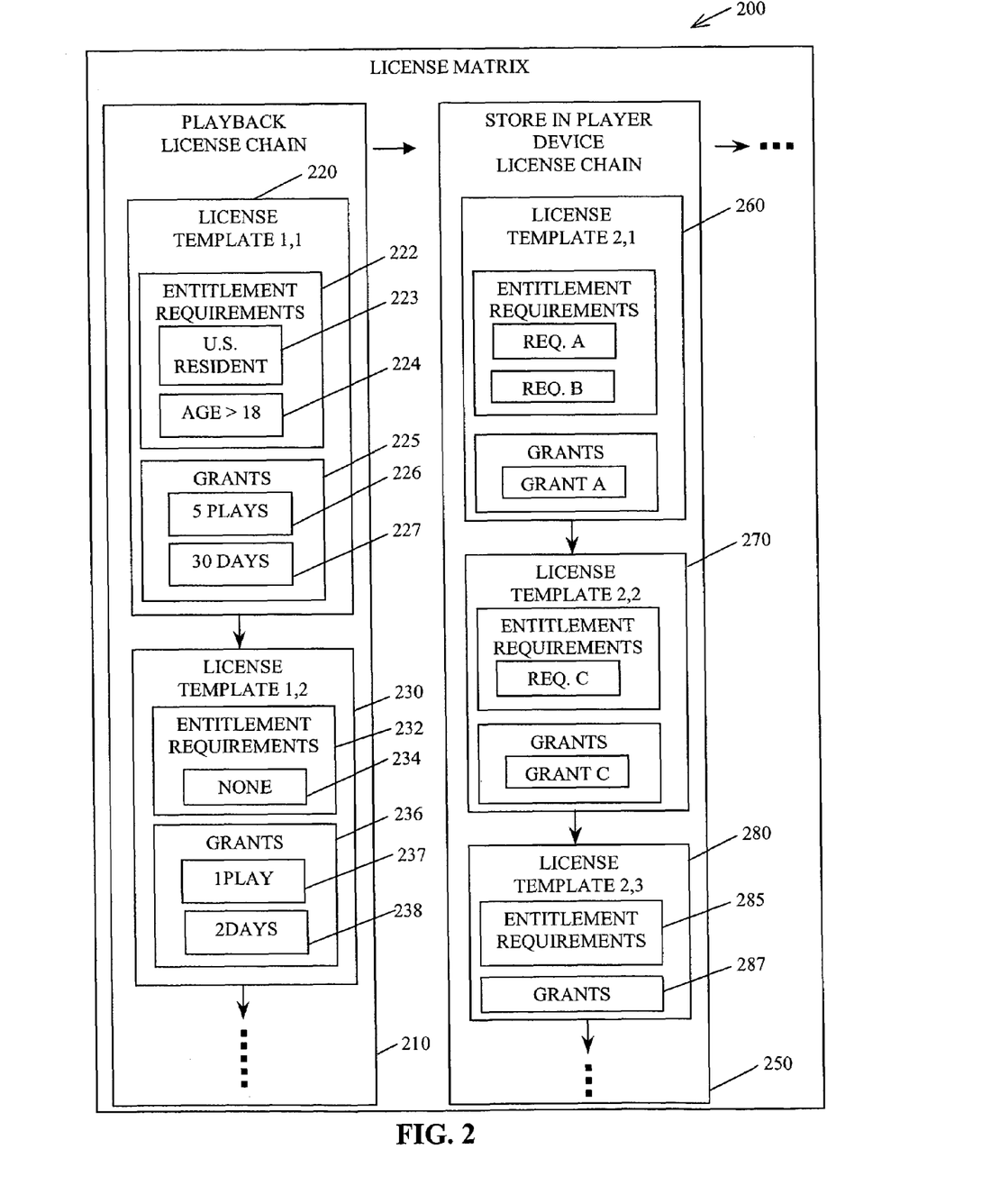
FIG. 2 is a schematic diagram illustrating an exemplary matrix license that can be used with the system shown in FIG. 1.

FIG. 2 is a block diagram of an exemplary license matrix that can be created and used with the system 100. The matrix 200 includes, but is not limited to, multiple data structures that identify one or more licenses that govern the authorized use of presentations 126 or 134 (see FIG. 1). In the embodiment shown, the matrix 200 includes a playback license chain 210 and a store-in-player-device license chain 250. Of course, in other embodiments the matrix 200 can include additional license chains, including a copy-to-disc license chain and a store-in-hard-drive chain (not shown), for example. Configuring a group of licenses into license chains can support the employment of promotion, non-renewable licenses, for example. Of course, a license matrix 200 or a license chain (e.g., license chain 210) that groups multiple licenses is not limited to actual physical arrangements, but it can also include any logical, virtual, or schematic arrangement that associates one or more licenses.

Each license chain of the matrix 200 may include one or more license templates, e.g., templates 220 and 230 of playback license chain 210. As shown in FIG. 2, a license chain such as the chain 250 can include three or more license templates 260, 270, and 280. In one embodiment, the license template 280, for example, includes (but is not limited to) a set of entitlement requirements 285 and a set of grants 287.

More particularly, as shown by license template 220, the entitlement requirements can include a set of attributes 223 and 224 that can be related to the attributes of a consumer computer 120 (or the attributes of an end-user of the consumer computer 120), and/or attributes associated with a content item. In the embodiment shown, the attribute 223 relates to a geographical requirement that the consumer computer 120 be located in the United States, or that the end-user of the consumer computer 120 be a United States resident. That is, according to this embodiment, the consumer computer 120 should have an attribute characterizing it as geographically located or residing in the United States in order to satisfy the entitlement requirement 223. By way of another example, the set of entitlement requirements 222 of the license chain 220 includes requirement 224, namely that the end-user of consumer computer 120 be 18 years of age or older.

Attributes include, but are not limited to, age of end-user, residence of end-user, form of payment employed by end-user, physical location of consumer computer 120, IP address of consumer computer 120, type of consumer computer 120 (e.g., server, desktop, laptop, portable, handheld, cellular phone, BlackBerry™, portable audio or video player, etc.), type of content typically accessed by end user, content format (e.g., text, audio, video, multi-media), content category (education, news, sports, entertainment, etc.), content topic (Abraham Lincoln, U.S. Presidents, San Diego, Calif., etc.), date, date range, content rating classification (e.g., Parental Guidance for under 13 (PG-13), Restricted (R), premium content, standard content, 1-5 star ratings), etc.

The license template 220 can also include a grant set 225 with two grants 226 and 227, for example. The grant set 225 defines the authorized use under the license template 220. Hence, in one embodiment of the matrix 200, if the consumer computer 120 meets the requirements 222 of the license 220, the consumer computer 120 is entitled to the uses defined by the grants 225. In this example, the consumer computer 120 is entitled to play the presentation 134 five times (grant 226) in a period of 30 days (grant 227). Similarly, under the license template 230, the consumer computer 120 is entitled to play the presentation 134 one time (grant 237) during a two day period (grant 238). It should be noticed that license template 230 includes an empty set of entitlement requirements 230, that is, the consumer computer 120 need not have any specific attributes to receive the authorization for the requested use. This can be the case, for example, when provider wants to promote certain content and desires that consumers have free and unfettered playback rights to the presentation 134 for a period of two days.

As will be described in greater detail below with reference to FIG. 4, in one embodiment of the system 100 a provider can configure the matrix 200 by accessing the license broker and server 140. The rights broker 142 uses the matrix 200 to determine whether any particular use request submitted by a consumer computer 120 can be authorized under any of the licenses defined in the matrix 200. Thus, it should be apparent that the matrix 200 in conjunction with the rights broker 142 and the content packaging service 130 allow a provider to define the rules under which secured content is delivered to consumer computers 120. One feature of the system 100, is that it allows the provider to employ a multiplicity of digital management rules that can be simply and conveniently configured, and which can be applied to any given presentation 134 separately from the application of a security system to the presentation 115. In other words, for any given presentation 115, a provider computer 110 can decouple the security system (which produces presentation 134) from the digital management rules applicable to the presentation 134.

Figure 3:
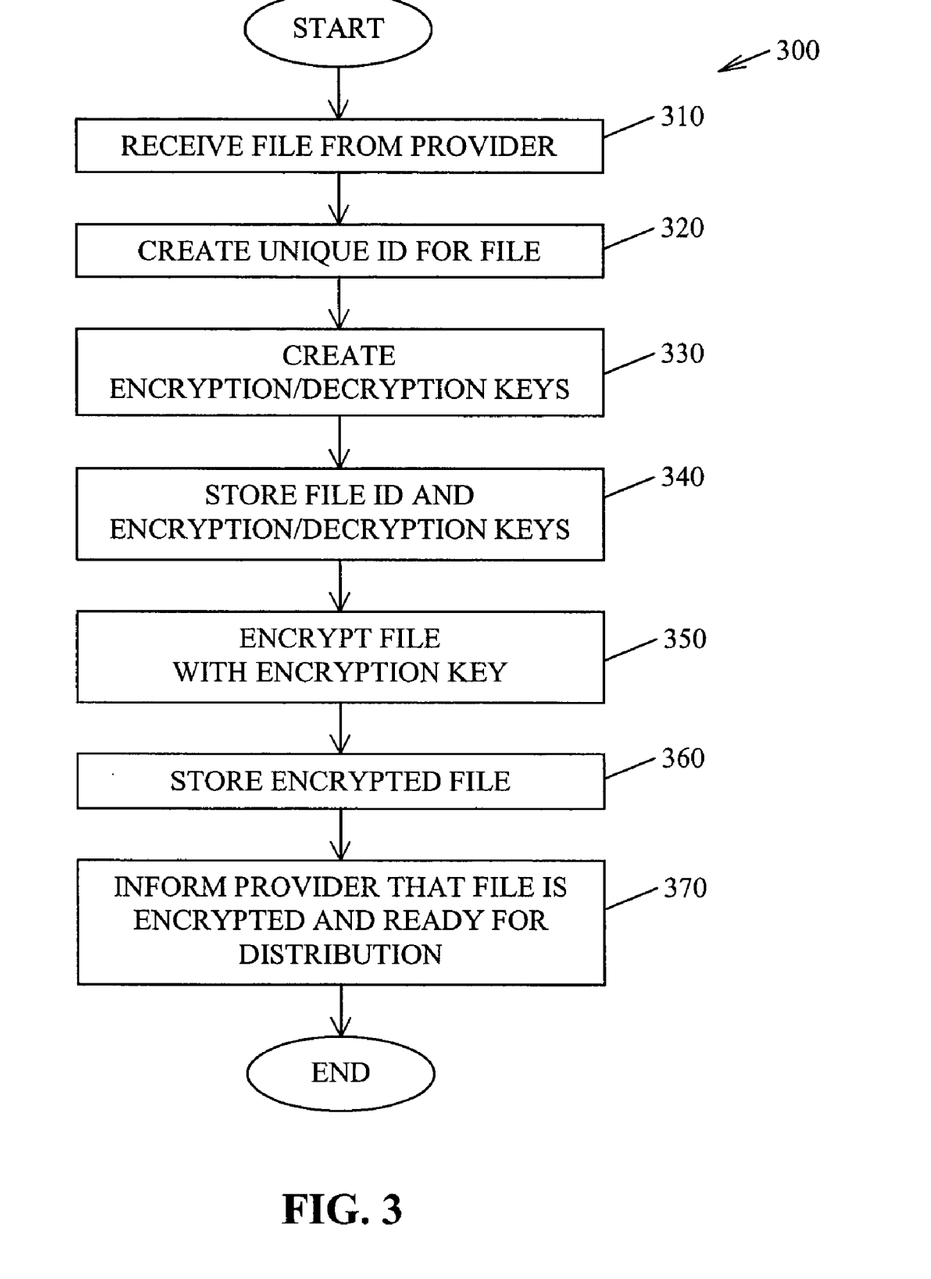
FIG. 3 is a flowchart illustrating an exemplary process of packaging content for distribution on via the system shown in FIG. 1.

FIG. 3 is a flowchart illustrating an exemplary process 300 of packaging a presentation 115 to produce a presentation 134, which includes the data of the presentation 115 in a format, or with enhancements, that provide security for the content of the presentation. Depending on the embodiment, states may be added, removed, or merged, and the sequence of the states rearranged. The process 300 starts at a state 310 where the packaging service 130 receives a content file, e.g., the presentation 115, from the provider computer 110. In one embodiment, the provider computer 110 uploads to a server of the packaging service 130 data that comprises the unprotected presentation 115. In another embodiment, the provider computer 110 forwards to the packaging service 130 a list of locations (e.g., universal resource locators) where the packaging service 130 can retrieve the presentation 130. Next, at a state 320, the packaging service 130 creates unique identification indicia for the presentation 134. This unique identification may be, for example, a numeric reference, or an alphanumeric reference, etc.

Proceeding to a state 330, the packaging service 130 creates encryption and decryption keys to secure the presentation 134. Next, at a state 340, the packaging service 130 stores the identification and encryption/decryption keys for the presentation 134. In one embodiment, the packaging service 130 stores the identification and encryption/decryption keys in a storage device local to the packaging service 130 in a database. In another embodiment, the packaging service 130 can be configured to forward the identification and encryption/decryption keys of the presentation 134 to the license broker and server 140, which stores the forwarded data in the license key and rules database 148, for example. In yet another embodiment, the packaging service 130 forwards the identification and encryption/decryption keys, along with the encrypted file below, to the provider computer 110, which may then apply its own digital management rules to the secured presentation 134.

At a state 350 of the process 300, the packaging service 130 encrypts the file having the unprotected presentation 115 to produce the protected presentation 134. The packaging service 130 can apply any one of a number of well known encryption algorithms, including for example, Pretty Good Privacy (PGP) encryption. In other embodiments, the encryption system may be a proprietary algorithm. Next, at a state 360 of the process 300, the packaging service 130 stores the encrypted presentation 134 in one of several possible locations. For example, the packaging service 130 can store the presentation 134 in a database local to the packaging service 130, or in a remote database (not shown), or in a database local to the license broker and server 140.

The process 300 proceeds to a state 370, wherein the packaging service 130 informs the provider computer 110 that the presentation 134 is encrypted and ready for distribution. In one embodiment, the packaging service 130 performs the functions of states 310 to 360 as the provider computer 110 submits each presentation 115 to the packaging service 130, and immediately after each such submission it informs the provider computer 110 that the presentation 115 has been processed and now is presentation 134 ready for distribution. In another embodiment, the provider submits a batch of presentations 115, the packaging service 130 processes the entire batch, and at the end of processing sends an electronic message (e.g., email) to the provider computer 110 notifying the provider computer 110 that the presentations 134 are ready for distribution. The process 300 then ends.

Figure 4:
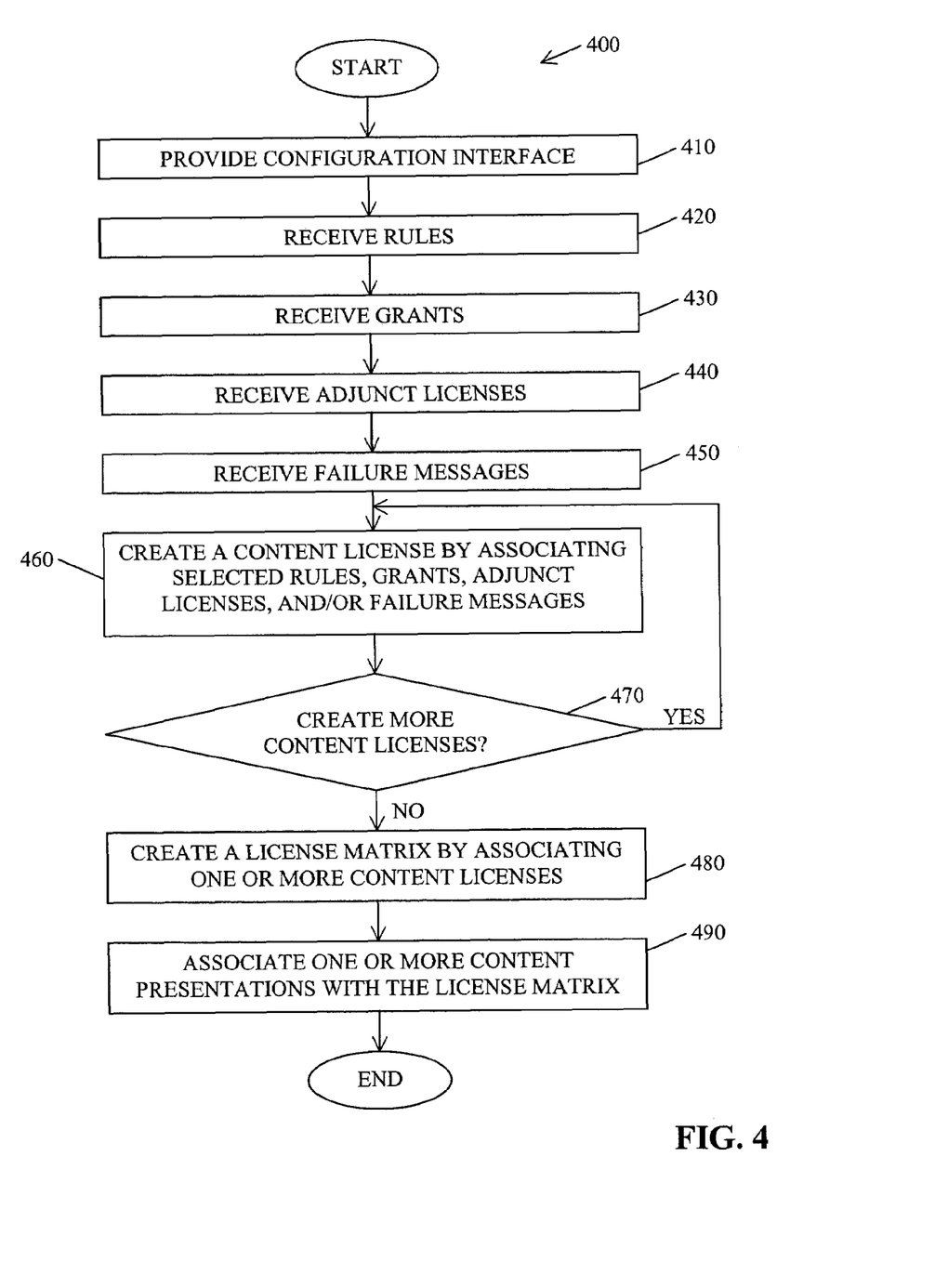
FIG. 4 is a flowchart illustrating an exemplary process of creating a license matrix such as the one shown in FIG. 2.

FIG. 4 is a flowchart illustrating an exemplary process 400 of creating a license matrix, such as license matrix 200 shown in FIG. 2. Depending on the embodiment, states may be added, removed, or merged, and the sequence of the states rearranged. In one embodiment, at a state 410 of the process 400, the provider computer 110 accesses a configuration interface that the license broker and server 140 presents to the provider computer 110. In one embodiment, the configuration interface includes a form of a Web page stored in a Web site associated with the license broker and server 140. The provider computer 110 access the Web page and enters the information discussed below. In yet another embodiment, the configuration interface may consist of a template-like (or "wizard") module that guides the provider computer 110 in a step-by-step fashion in configuring the matrix 200. It should be understood that a provider can use the provider computer 110 to enter information in the configuration interface, which information the license broker and server 140 can then use to configure the license matrix 200.

Next, at a state 420 of the process 400, the license broker and server 140 can receive rules that the provider computer 110 uses to, for example, define the entitlement requirements 285 of a license template 280 (see FIG. 2). The rules can be in the form of Boolean expressions having one or more predicates. A predicate consists of a function that evaluates to true or false. For example, the predicate "age>18" evaluates to true if the end-user of the consumer computer 120 is older than 18 years of age, but evaluates to false if the end-user is 18 years of age or younger. By way of a further example, the predicate "U.S. Resident" evaluates to true if the end-user is a resident of the United States, but evaluates to false if the end-user does not have the attribute identifying it as a U.S. resident (note that the same applies if the geographical requirement is to be applied to the physical location of the consumer computer 120).

Hence, a rule may consist of the Boolean expression including the predicates "age>18" and "U.S. Resident." Some such rules would be, for example: (age>18) AND (U.S. Resident), (age>18) AND NOT (U.S. Resident), (age>18) OR (U.S. Resident), (age>18) OR NOT (U.S. Resident), (age>18) NOT (U.S. Resident), etc. The "AND", "OR", "NOT", "AND NOT", "OR NOT" are common operators in Boolean expressions. It should be understood that the rules can also include nested Boolean expressions, for example: (REQ. A) OR (REQ. B AND REQ. C).

In one embodiment, the configuration interface that the license broker and server 140 provides at the state 410 includes lists of predicates and Boolean operators so that the provider can create the rules in a convenient manner. For example, in one embodiment, the configuration interface allows the provider computer 110 to choose from a list a single date, or a date range, to create a rule based on dates.

Proceeding to a state 430 of the process 400, the license broker and server 140 receives the grants 287, for example (see FIG. 2), that the provider computer 110 can employ to apply to any one presentation 134. The grants may be, for example, a number of playbacks, copies, and/or computer devices associated with any one consumer computer 120. The grants may also include date ranges, or time periods, etc.

Next, at a state 440 of the process 400, the license broker and server 140 may receive a set of adjunct licenses. In some embodiments, the use of presentations 134 by consumer computer 120 may be governed by a subscription-based license (namely, an adjunct license), for example. In such cases, the consumer computer 120 may be entitled to use the presentation 134 according to a predefined set of rules that applies to a subscription period, rather than applying specifically to a particular use of a specific presentation 134. For example, a consumer may have purchased a license, renewable on a monthly basis, that entitles the consumer computer 120 to playback, copy, and/or modify any one presentation 134 offered by a specific provider computer 110.

Proceeding to a state 450 of the process 400, the license broker and server 140 receives from the provider computer 110 a number of failure messages, which can be associated with any one license chain 220 or license template 222 to inform the consumer computer 120 that the requested use is not allowed under the respective license template 222, license chain 220, or even matrix 200. Of course, in other embodiments the failure messages may be messages that inform the consumer computer 120 of the options available when the license broker and server 140 finds that the requested use is not authorized under any license template of the license matrix 200.

At a state 460 of the process 400, the provider computer 110 can create a license template 280 by associating one or more selected rules with one or more grants and one or more failure messages. In one embodiment, for example, the provider computer 110 creates the license template 220 by associating the rule (age>18) AND (U.S. Resident) with the grants 5 plays and 30 days. Although not shown in FIG. 2, each license template can include a reference to an adjunct license and a reference to a failure message. In some embodiments, some failure messages are associated with specific rules and/or specific grants. The license broker and server 140, in one embodiment, stores the license template 280 in the license key and rules database 148.

At a decision state 470, the license broker and server 140 determines whether the provider computer 110 wants to create more license templates. In one embodiment, the configuration interface provides a command that the provider computer 110 can select to indicate that it wishes to create additional license templates. If the provider computer 110 wants to create more license templates, the process 400 returns to the state 460, wherein the provider computer 110 can select rules, grants, adjunct licenses, and failure messages to craft yet another license template. If the provider computer 110 is done creating license templates, the process 400 moves onto the state 480.

At the state 480, in one embodiment the provider computer 110 can employ the license broker and server 140 to create a license matrix 200 by grouping one or more license templates into a license chain, and then grouping one or more license chains into a license matrix 200. As discussed with reference to FIG. 2 above, a license chain may refer to a specific form of use for presentation 134. However, license chains may be created according to any other logical grouping that best suits the specific embodiment.

Proceeding to a state 490 of the process 400, the provider computer 110 uses the configuration interface to associate one or more presentations 134 with the license matrix 200. That is, the provider computer 110 indicates the terms of use of any one presentation 134 by associating the license matrix with the presentation 134. When the consumer computer 120 requests a particular use of the presentation 134, and there is no local license 124 that authorizes the use of the presentation 134, or a specific use of the presentation 134, the license broker and server 140 applies the license matrix 200 to determine whether the consumer computer 120 qualifies, or its attributes can be modified to qualify, for the specific use request of a particular presentation 134. After the provider computer 110 finishes associating presentations 134 with the license matrix 200, the process 400 ends.

Figure 5:
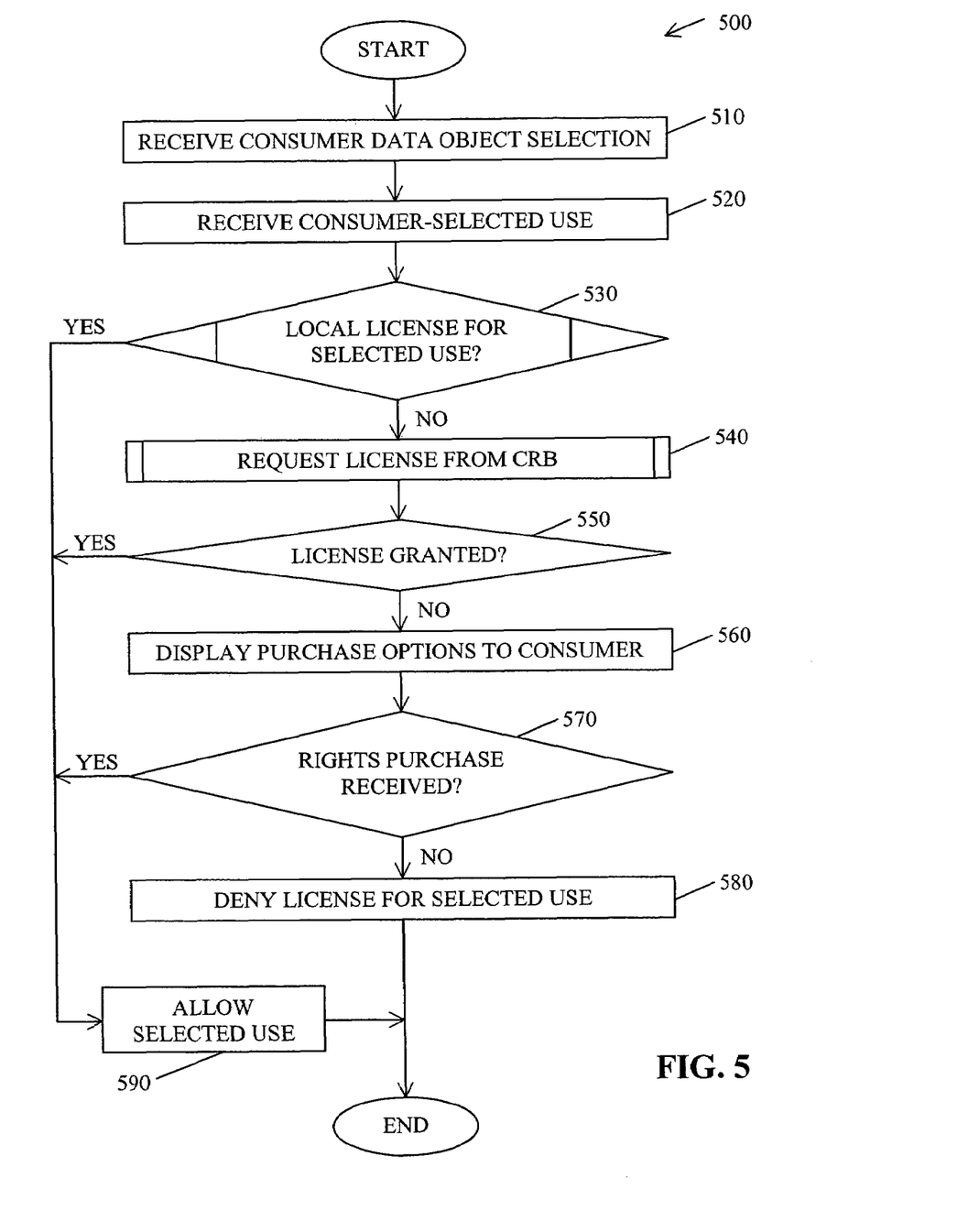
FIG. 5 is a flowchart illustrating an exemplary process of evaluating consumer requests for consumption of content subject to licensing.

FIG. 5 is a flowchart of an exemplary process 500 of evaluating use requests, made by the consumer computer 120, to determine whether a license authorizes use of the particular presentation in the specific mode requested. Depending on the embodiment, states may be added, removed, or merged, and the sequence of the states rearranged. Briefly, in one exemplary embodiment of the process 500, the consumer request to copy an audio file to a compact disc, and in response the license broker and server 140 determines whether there is a license that permits the consumer computer 120 to copy that particular audio file. In another embodiment, the license broker and server 140 determines whether the particular presentation is subject to a license. If the presentation is subject to a license, the license broker and server 140 determines whether the consumer computer 120 has the appropriate license for the particular presentation and specific use. If the presentation is not subject to a license, the consumer computer 120 is allowed to use the particular presentation in any manner the consumer computer 120 (or its associated end-user) chooses.

The process 500 begins at a state 510, wherein the player interface 122 receives a request from the consumer computer 120 to use of a particular presentation 126. The presentation 126 may be protected or unprotected, and subject to a license or available free of licenses. In one embodiment, the presentation 126 is a local copy of the presentation 134. In another embodiment, the presentation 126 is merely an icon, button, graphical object, etc., that points to the presentation 134 or the presentation 115. The presentation 126 preferably includes attributes such as a unique identifier, for example. In one embodiment, the license broker and server 140, rather than the player interface 122, receives the request from the consumer computer 120. In yet another embodiment, the content item includes an indicator (e.g., a universal resource locator) that points to the location of the content rights broker 142 in a computer network. Thus, in one embodiment the content item may reside anywhere in a computer network, but a license to use will be generated by the content rights broker 142 specified at the time of packaging the content item.

Next, the process 500 proceeds to a state 520 where depending on the embodiment the player interface 122 or the license broker and server 140 receives an indication of the particular use that the consumer computer 120 requests to make of the presentation 126. For example, the consumer computer 120 may request to playback an audio, video, or multi-media presentation file. By way of another example, the consumer computer 120 may request to copy to a compact disc a text file having multiple images associated with it, e.g., a magazine or newspaper article, encyclopedia or dictionary entry, etc. In one embodiment, when the consumer computer 120 activates or attempts to access the presentation 126, the player interface 122 detects the type of use the consumer computer 120 is requesting, e.g., playback, copying to a storage device, downloading to a portable player, etc.

The process 500 moves to a decision state 530 where the player interface 122 determines whether the use request is governed by a local license 124 (see FIG. 1). In other embodiments, the functions of the decision state 530 are performed by the license broker and server 140, rather than the player interface 122. In yet other embodiments, the player interface 122 and the license broker and server 140 cooperate to perform the functions associated with the decision state 530. An exemplary process 600 of performing the functions of the decision state 530 is described below with reference to FIG. 6.

If there is a local license 124 that permits the consumer computer 120 to make the specific use requested of the particular presentation 126, the process 500 moves to a state 590 wherein the player interface 122 allows the consumer computer 120 to perform the requested use. The process 500 then ends.

If, however, the player interface 122 determines at the decision state 530 that there is no local license 124 that authorizes the consumer computer 120 to perform the requested use, the process 500 proceeds to a state 540. At the state 540 the player interface 122 forwards the use request to the license broker and server 140 for further processing to determine whether the requested use is subject to a license of the license matrix 200 (see FIG. 2). An exemplary process 700 for performing the functions of the state 540 is described below with reference to FIG. 7.

The process 500 continues to a decision state 550 where the license broker and server 140 or the player interface 122 determines whether the rights broker 142 identified a license from the license matrix 200 that authorizes the requested use. In one embodiment, the presentation 126 is subject to a license and the license server 144 forwards the appropriate decryption key to the player interface 122 so that the consumer computer 120 can perform the requested use. In another embodiment, the rights broker 142 determines that the presentation 126 is not subject to a license and communicates this to the player interface 122, which then allows the user to perform the requested use. Hence, if at the decision state 550 the player interface 122 determines that a license has been granted, the process 500 proceeds to the state 590, where the player interface 122 allows the requested use. The process 500 then ends.

If at the decision state 550 the player interface 122 determines that the presentation 126 is subject to a license but that the rights broker 142 has not granted the license, the process 500 moves to a state 560. At the state 560 the player interface 122 communicates to the consumer computer 120 (or its associated end-user) different options to gain access to the presentation 126. In one embodiment, for example, the rights broker 142 determines what consumer attributes the consumer computer 120 may modify in order to have access to the presentation 126. By way of example, the consumer computer 120 may have exceeded the number of distinct computing devices allowed to execute the presentation 126. When this is the case, the player interface 122 communicates this to the end-user, who may then attempt to access the presentation 126 from a different computing device, or may opt to increase the number of distinct computing devices that are allowed under the license. In yet another embodiment, the player interface 122 provides the consumer computer 120 with one or more license purchasing options for accessing the presentation 126.

The process 500 continues at a decision state 570 wherein the player interface 122 determines whether the consumer computer 120 has purchased the licensing rights to access the presentation 126. If the consumer computer 120 purchases the license, the process 500 proceeds to the state 590, and the consumer can perform the requested use. However, if the consumer computer 120 declines to purchase the license, the process 500 moves to a state 580 where the player interface 122 informs the consumer computer 120 that the license is denied and, therefore, the requested use is not allowed. The process 500 then ends.

Figure 6:
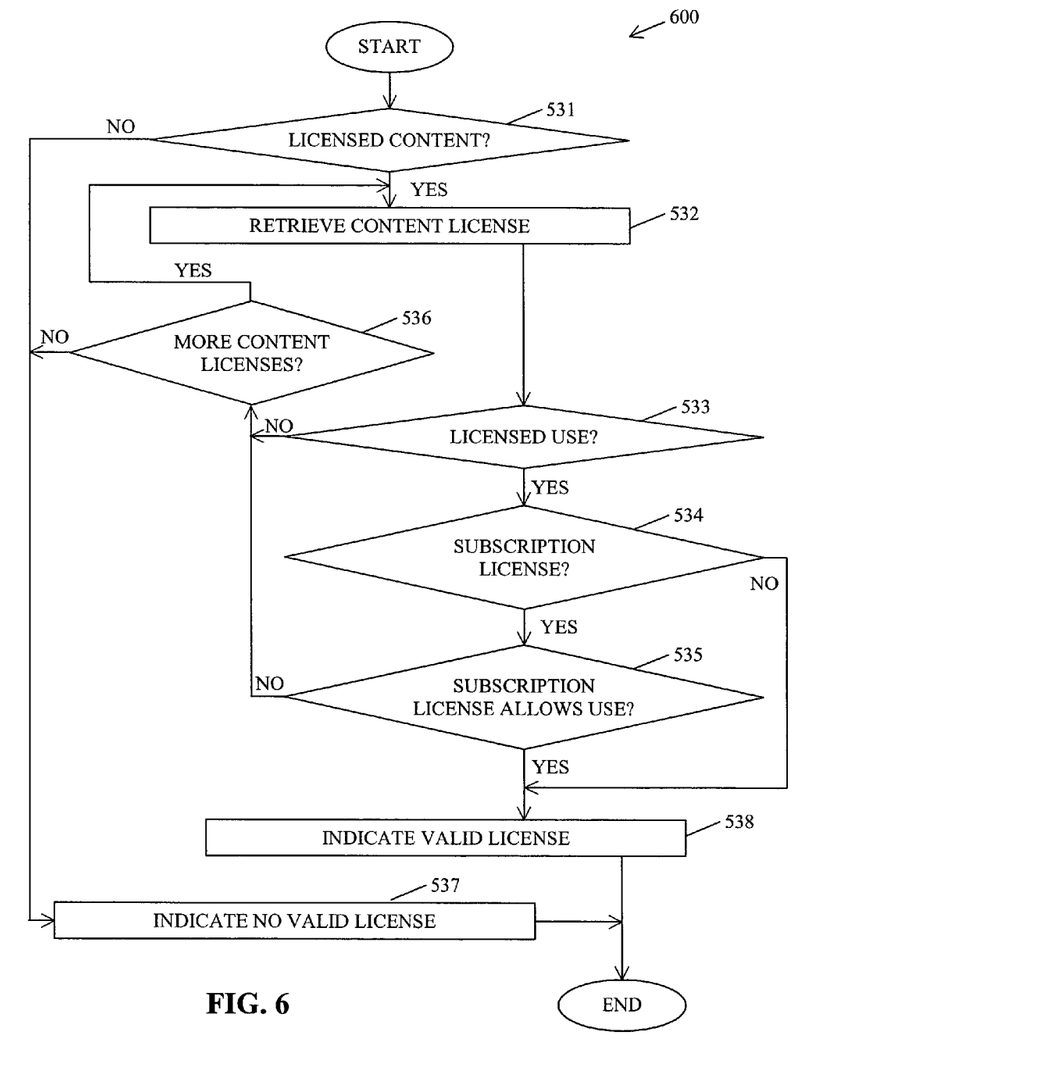
FIG. 6 is a flowchart illustrating an exemplary process of determining whether there is a license local to the consumer that would grant the consumer a right to perform the consumer's requested consumption of certain content. This exemplary process can be used in conjunction with the process shown in FIG. 5.

FIG. 6 is a flowchart illustrating an exemplary process 600 of determining whether there is a local license 124 that authorizes the consumer computer 120 to perform the requested use. The process 600 is an exemplary process of the functions that can be performed at the state 530 of the process 500 shown in FIG. 5. Depending on the embodiment, states may be added, removed, or merged, and the sequence of the states rearranged.

The process 600 starts at a decision state 531 where the player interface 122 determines whether the presentation 126 is subject to a local license 124. In one embodiment, the player interface 122 checks the unique identifier of the presentation 126 against the corresponding identifiers in the local licenses 124. If the presentation 126 is not subject to a local license 124, the process 600 moves to a state 537 where the player interface 122 indicates that there is no local license 124 that authorizes use of the requested presentation 126. The process 600 then ends, and the process 500 can continue at the state 540 (see FIG. 5) wherein the rights broker 142 evaluates the use request to determine whether the use request is governed by a license in the license matrix 200.

If at the decision state 531 the player interface 122 determines that there is a local license 124 that authorizes use of the requested presentation 126, the process 600 moves to a state 532. At the state 532, the player interface 122 retrieves one of the local licenses 124 to determine, at a decision state 533, whether the requested use of the presentation 126 is authorized under the license. In one embodiment, for example, the local license 124 may grant to the consumer computer 120 only playback rights for the presentation 126. Hence, if at the decision state 533 the player interface 122 determines that the requested use is not licensed, the process 600 proceeds to a state 536 where the player interface 122 determines whether there are additional local licenses 124 to evaluate for authorization of the requested use of the presentation 126.

If at the decision state 536 the player interface 122 determines that there are no additional local licenses 124 to evaluate, the process 600 continues at the state 537, where the player interface 122 indicates that there is no valid license for the requested use. The process 600 then ends as described above. If, on the other hand, at the decision state 536 the player interface 122 determines that there are more local licenses 124 to evaluate, the process 600 returns to the state 532 and proceeds as already described above.

If the player interface 122 determines at the decision state 533 that the requested use is authorized by a local license 124, the process 600 moves to a decision state 534 where the player interface 122 determines whether the consumer computer 120 has a subscription license. If the consumer computer 120 does not have a subscription license, the process 600 proceeds to a state 538, wherein the player interface 122 indicates that there is a valid license for the requested use, namely, an authorization to make the specific requested use of the particular presentation 126. The process 600 then ends, and control and data flow may pass to the state 590 of the process 500.

If the consumer computer 120 does have a subscription license, the process 600 moves from the decision state 534 to a decision state 535, wherein the player interface 122 determines whether the subscription license allows the requested use. In one embodiment, for example, there may be a local license 124 that allows the requested use of the particular presentation 126; however, the consumer computer 120 may be constrained by an adjunct subscription license that may not allow the consumer computer 120 to perform the requested use of the presentation 126. For example, while there may be a local license 124 that would authorize the copying of an audio file to a compact disc, the adjunct subscription license governing consumer computer 120 may not grant copying rights but only playback rights for any presentations 126.

Thus, if at the decision state 535 the player interface 122 determines that the subscription license does not authorize the requested use, the process 600 moves to the decision state 536 and continues as already described above. However, if the player interface 122 determines that the subscription license authorizes the requested use, the process 600 proceeds to the state 538, wherein the player interface 122 indicates that there is a valid local license 124 for performing the requested use. The process 600 then ends.

Figure 7:
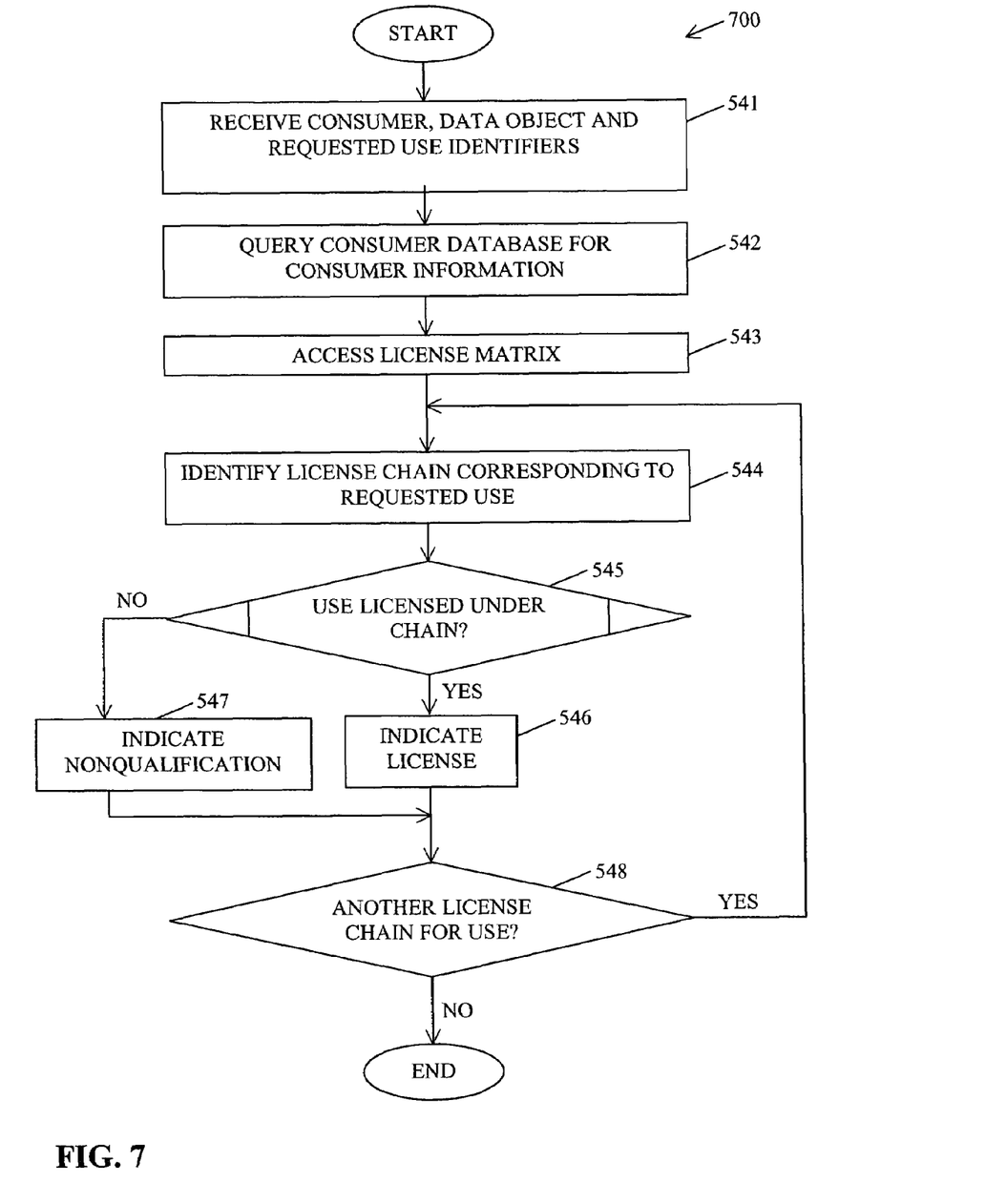
FIG. 7 is a flowchart illustrating an exemplary process of determining whether a consumer's requested consumption of content qualifies under a license matrix, such as the license matrix shown in FIG. 2. This process can be used in conjunction with the process shown in FIG. 5.

FIG. 7 is a flowchart illustrating an exemplary process 700 of determining whether a use request by the consumer computer 120 qualifies under a license matrix, such as the license matrix shown in FIG. 2. The process 700 is an exemplary process that the rights broker 142 can execute at the state 540 of the process 500 shown in FIG. 5. Depending on the embodiment, states may be added, removed, or merged, and the sequence of the states rearranged.

The process 700 starts at a state 541 wherein the license broker and server 140 receives data relating to the consumer computer 120 and the use request, including for example, identifiers of the consumer computer 120 and the presentation 126, as well as an indication of the requested use. The identifiers associated with the consumer computer 120 may be attributes that characterize the consumer computer 120 in one or more ways. For example, the attributes may includes a computing device unique identifier, the geographical location of the device, the type of device, etc. The attributes characterizing the consumer computer 120 may also include information about the end-user associated with the consumer computer 120. For example, the attributes may include the end-user's age, locale of residence, preferred payment method, etc.

Similarly, the presentation 126 is preferably associated with one or more attributes that identify and/or characterize the presentation 126. For example, in one embodiment, the presentation 126 simply has one attribute, namely a unique, universal identifier. The rights broker 142 can use that identifier to query a database of the provider computer 110, the packaging service 130, or the license broker and server 140 to retrieve additional information about the presentation 126. In other embodiments, the attributes associate with the presentation 126 may indicate the type of presentation (e.g., text, image, audio, video, or multi-media), the format (e.g., .doc, .pdf, .wav, .mov, etc.), source provider computer 110 (e.g., news outlet, entertainment company, etc.).

The identifiers for the use can be one or more indications retrieved by the player interface 122 as the consumer computer 120 attempts to access or make a specific use of the presentation 126. For example, the player interface 122 may detect that the consumer computer 120 is attempting to play-back, copy to compact or video disc, download to a portable player, etc., the presentation 126. At the state 541, the rights broker 142 receives this information along with the attributes of the consumer computer 120 and the presentation 126.

The process 700 next moves to a state 542, wherein the rights broker 142 queries the consumer database 149 (see FIG. 1) for information about the consumer computer 120 (or its associated end-user). In one embodiment, for example, the rights broker 142 receives from the player interface 122 only an identification for the consumer computer 120. In that case, the rights broker 142 accesses the consumer database 149 to retrieve further attributes that characterize the consumer computer 120.

The process 700 then proceeds to a state 543 to access a license matrix 200 (see FIG. 2). The data constituting the license matrix 200 may be stored in the license key and rules database, for example. As already described with reference to FIG. 2, the license matrix 200 includes a plurality of license templates (e.g., license templates 222 and 280 of FIG. 2) grouped in logical license chains (e.g., playback license chain 210 of FIG. 2). In one embodiment, at a state 544 of the process 700 the rights broker 142 identifies a license chain that has been configured to correspond to the requested use. Of course, the grouping of licenses in the matrix 200 may reflect any other logical arrangement that is best suited for the particular embodiment. The rights broker 142 simply selects a license chain that is appropriate under the given embodiment for evaluating whether the requested use is authorized under any license template of the identified license chain.

The process 700 continues at a decision state 545 where the rights broker 142 determines whether the requested use is licensed under any one of the license templates of the license chain identified at the state 544. An exemplary process 800 that the rights broker 142 can employ to performs the functions of the decision state 545 is described in detail with reference to FIG. 8 below. If the rights broker 142 determines that there is a license template that authorizes the requested use, the rights broker 142 indicates this at a state 546. If, however, the rights broker 142 determines that there is no license template that authorizes the requested use, at a state 547 of the process 700 the rights broker 142 indicates non-qualification for the requested use.

The process 700 then continues at a decision state 548, wherein the rights broker 142 determines whether there is another license chain in the license matrix 200 to evaluate. In one embodiment, the rights broker 142 evaluates every license template of every chain in the license matrix 200, and it indicates for each license template whether the license template authorizes or not the requested use. If at the decision state 548 the rights broker 142 determines that there are additional license chains to evaluate, the process 700 returns to the state 544 and proceeds as already described above. If, however, at the decision state 548 the rights broker 142 determines that there are no more license chains to evaluate, the process 700 ends.

Figure 8:
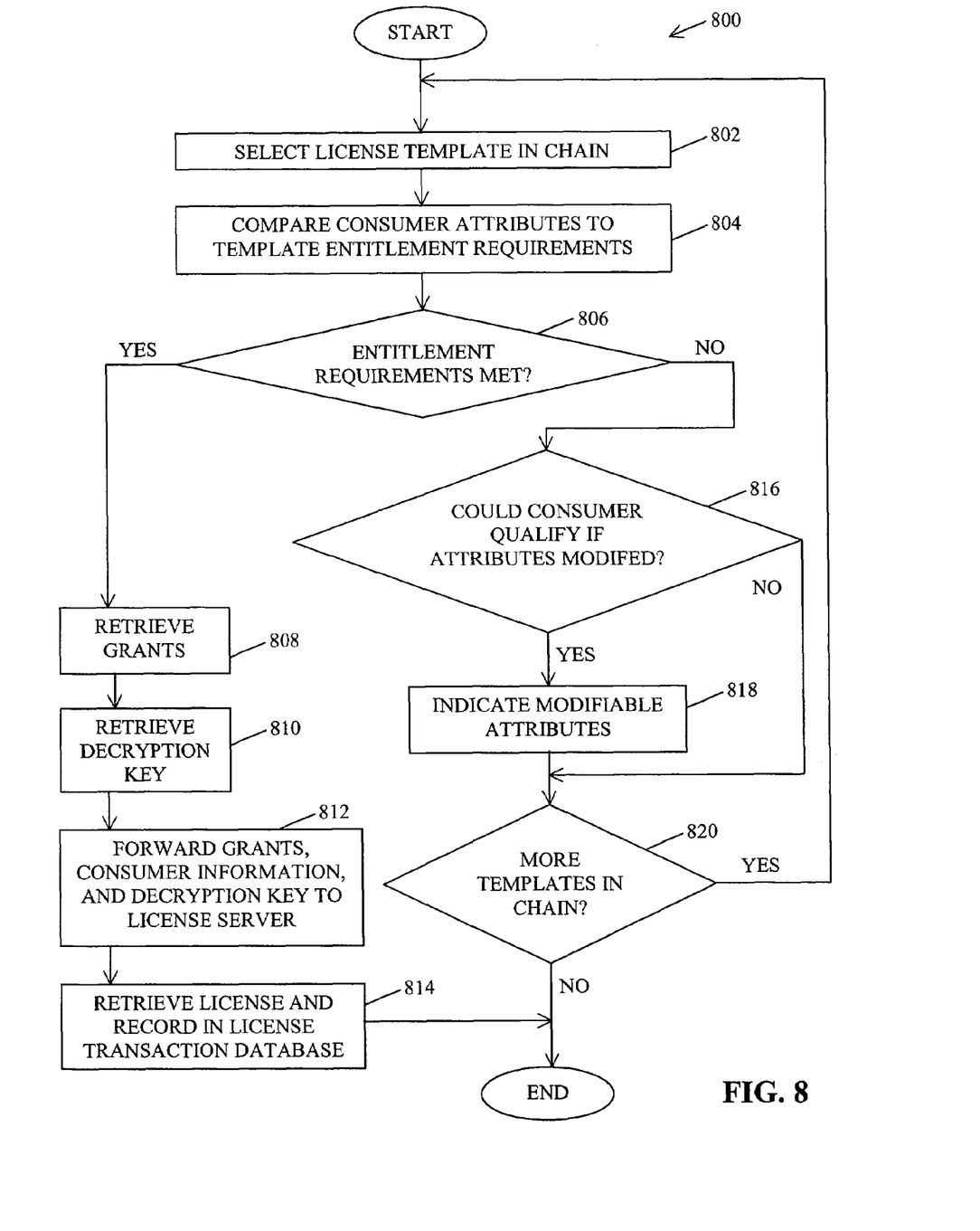
FIG. 8 is a flowchart illustrating an exemplary process of determining whether a consumer's consumption request is licensed under a license chain that is part of a license matrix. This process can be used in conjunction with the process of FIG. 7.

FIG. 8 is a flowchart illustrating an exemplary process 800 of determining whether a use request is licensed under a license chain that is part of a license matrix 200. The process 800 is an exemplary process of the functions that the rights broker 142 can perform at the decision state 545 of the process 500 shown in FIG. 5. Depending on the embodiment, states may be added, removed, or merged, and the sequence of the states rearranged.

The process 800 starts at a state 802 where the rights broker 142 selects a license template (e.g., license template 220) of a license chain (e.g., playback license chain 210) of the matrix license 200. The process involved in executing the state 802 may be, in one embodiment, accessing the license key and rules database 148 of the license broker and server 140 to retrieve the entitlement requirements (e.g., requirements 222) and grants (e.g., grants 225) associated with the selected license template.

The process 800 next moves to a state 804 wherein the rights broker 142 compares certain attributes of the consumer computer 120 to the entitlement requirements of the license template. In one embodiment, this comparison entails that the rights broker 142 apply the rules that the provider computer 110 created at the state 420 of the process 400 shown in FIG. 4. For example, the rights broker 142 can be configured to evaluate the Boolean-based rules to the attributes of the consumer computer 120 to determine whether the entitlement requirements 222 are met. That is, in one embodiment, the rights broker 142 may access the age attribute of the end-user of the consumer computer 120 and evaluate whether the expression (age>18) is true or false (i.e., the rights broker 142 evaluates the predicates of the Boolean-based rules using the attributes of the particular consumer computer 120 or its end-user).

By way of a further example, the rights broker 142 also may evaluate the expression (U.S. Resident) and determine whether the geographical attribute associated with the consumer computer 120 makes the expression true or false. Finally, the rights broker 142 then evaluates the whole Boolean-based rule to determine if the consumer computer 120 meets the entitlement requirements. That is, if the attributes of the consumer computer 120 evaluate to "true" when evaluating the rule (age>18) and (U.S. resident), then the consumer computer 120 meets the entitlement requirements 222 under the license template 220.

The process 800 continues to a decision state 806, wherein the rights broker 142 determines whether the attributes of the consumer computer 120 (or the end-user) meet the entitlement requirements defined by the license template. If the rights broker 142 determines that the entitlement requirements are met, the process 800 moves to a state 808, wherein the rights broker 142 retrieves the grants associated with the license template under evaluation. The rights broker 142 may retrieve the grants from, for example, the license key and rules database 148. Of course, the grants associated with the license may be stored in any convenient storage device or data structure depending on the specific embodiment.

The process 800 next moves to a decision state 810 in which the rights broker 142 retrieves the decryption key associated with the presentation 126 or 134 requested by the consumer computer 120. Retrieving the encryption key may include having the rights broker 142 access the license key and rules database 148, for example. It should be noted that in one embodiment it is convenient to store the attributes of the presentation 126 or 134 in data structures logically related to the data structures storing the security and use management rules pertaining to the presentation 126 or 134.

At a state 812 of the process 800, the rights broker 142 forwards the grants, information about the consumer computer 120, and decryption key to the license server 144 (see FIG. 1). In one embodiment, the license server 144 encrypts the grants and information about the consumer computer 120 (or the associated end-user) such that only the consumer computer 120 having the decryption key can decrypt the grants and information associated with the consumer computer 120 (or the end-user). The process 800 next moves to a state 814, wherein the license server 144 retrieves the license (i.e., the decryption key and grants), and records the license transaction in the license transaction database 146 (see FIG. 1). The system 100 can employ the license transaction database 146 to keep track of the different licenses that authorize a requested use. The process 800 then ends.

If at the decision state 806 the rights broker 142 determines that the attributes of the consumer computer 120 do not meet the entitlement requirements, the process 800 proceeds to a decision state 816. At the decision state 816, the rights broker 142 determines whether the consumer computer 120 could qualify if one or more attributes were modified. For example, with reference to the discussion above regarding the requirement (age>18), if the end-user has less than 18 years of age, the rights broker 142 can determine that if the end-user's age attribute were changed, the rights broker 142 could grant the license to the consumer computer 120. This may be the case where, for example, an end-user has recently turned 18 years of age but the system has not updated the consumer information yet. One example of an attribute that cannot be modified is the geographical requirement of the license. Thus, if the requirement is (U.S. resident) and the consumer computer 120 device is physically located outside the United States, it would not be practical or even possible to change the geographical location of the consumer computer 120. In the latter case, the consumer computer 120 cannot modify the geographical attribute in order to meet the entitlement requirements.

If at the decision state 816 the rights broker 142 determines that there are modifiable attributes, the process 800 next proceeds to a state 818, wherein the rights broker 142 indicates the modifiable attributes. The rights broker 142, in one embodiment, stores the information associated with the modifiable attributes for later retrieval by the system 100. The license broker and server 140 can forward the information regarding the modifiable attributes to the consumer computer 120. However, if at the decision state the rights broker 142 determines that there are no modifiable attributes, the process 800 moves to a decision state 820, wherein the rights broker 142 determines whether there are additional license templates in the license chain to evaluate. If there remains license templates for evaluation, the process 800 returns to the state 802 and proceeds as described above. If, however, there are no more license templates to evaluate, the process 800 ends.

While the above detailed description has shown, described, and pointed out features of the invention as applied to various embodiments, it should be understood that various omissions, substitutions, and changes in the form and details of the devices or processes described may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method for controlling access to digital content, the method comprising:
   storing with a first computing device at least one license for authorizing use of the content, the at least one license being defined from a rule that is based at least in part on at least one of i) at least one user attribute and ii) an attribute associated with the content item;
   receiving with a second computing device a request to use the content;
   determining with the second computing device whether or not the at least one license authorizes the requested use of the content comprising:
      comparing an entitlement requirement associated with the at least one license against at least one of:
         an attribute of a user who has made the request; and
         an attribute associated with the content item; and evaluating at least one Boolean expression embodied by the rule;

responsive to said determination, authorizing the requested use of the content if the at least one license authorizes the requested use; and providing with a third computing device an option to modify the at least one user attribute to qualify for a license, responsive to the determining finding that the at least one license authorizes the requested use.

2. The method of claim 1, wherein the user attribute comprises the user's age.

3. The method of claim 1, wherein the user attribute comprises the user's residence.

4. The method of claim 1, wherein the user attribute comprises a payment method.

5. The method of claim 1, wherein the at least one license comprises at least one grant.

6. The method of claim 1, wherein the Boolean expression comprises at least one argument based on the at least one user attribute.

7. The method of claim 1, wherein the requested use comprises playback.

8. The method of claim 1, wherein the requested use comprises copying to a compact disc.

9. The method of claim 1, wherein the requested use comprises copying to a digital video disc.

10. The method of claim 1, wherein the requested use comprises copying to a hard-drive.

11. The method of claim 1, wherein the requested use comprises downloading to a portable player.

12. The method of claim 1, wherein the rule is dynamically reconfigurable.

13. The method of claim 1, wherein the at least one license is dynamically reconfigurable.

14. The method of claim 1, wherein determining whether or not the at least one license authorizes the requested use comprises determining whether or not a license grant has been obtained by a user who has made the request.

15. The method of claim 1 wherein providing information on how to qualify for a license comprises providing a user attribute that would allow authorization of the requested use.

16. The method of claim 1 wherein providing information on how to qualify for a license comprises providing an amount of money that, if received, would allow authorization of the requested use.

17. The method of claim 1 wherein the first and second computing devices are the same computing device.

18. The method of claim 1 wherein the first, second and third computing devices are the same computing device.

19. The method of claim 1 wherein the first and third computing devices are the same computing device.

20. The method of claim 1 wherein the second and third computing devices are the same computing device.

21. The method of claim 1 wherein the user attribute comprises a computing device unique identifier.

22. The method of claim 1, further comprising:
providing with the third computing device an option to purchase a license, if none of the plurality of licenses authorizes the use.

23. The method of claim 1, wherein the Boolean expression comprises at least one argument that corresponds to at least one attribute of at least one user and/or associated with the content item.

24. The method of claim 1, wherein the Boolean expression comprises at least one attribute associated with the content item.

25. The method of claim 1, further comprising more than one license.

26. The method of claim 25, wherein the more than one licenses are associated in at least one license chain.

27. The method of claim 25 comprising more than one license chain and wherein the more than one license chains are associated in a license matrix.

28. The method of claim 25 wherein the at least one license chain corresponds to an indicator for a use of the content item.

29. The method of claim 27 wherein the license matrix further comprises one or more failure messages associated with the one or more licenses.

30. The method of claim 29 wherein at least one of the one or more failure messages are communicated to the user.

31. The method of claim 25, wherein the licenses are grouped in accordance with different uses of the content item.

32. The method of claim 31, wherein the licenses within each grouping of licenses are arranged according to a predetermined order.

33. The method of claim 32, wherein the predetermined order comprises a hierarchical ordering.

34. The method of claim 32, wherein the predetermined order comprises an ordering according to the breadth of grants associated with the licenses.

35. The method of claim 32, wherein the predetermined order comprises an ordering based on the restrictiveness of the rules associated with the licenses.

36. The method of claim 1, wherein the at least one license is associated with one or more granted rights.

37. The method of claim 1, wherein the entitlement requirement comprises the Boolean expression.

38. The method of claim 1, wherein the attribute of a user and/or associated with the content item is associated with a rating classification.

* * * * *

UNITED STATES PATENT AND TRADEMARK OFFICE
CERTIFICATE OF CORRECTION

| | | |
|---|---|---|
| PATENT NO. | : 7,748,030 B1 | Page 1 of 1 |
| APPLICATION NO. | : 10/608278 | |
| DATED | : June 29, 2010 | |
| INVENTOR(S) | : Erik W. Selberg et al. | |

It is certified that error appears in the above-identified patent and that said Letters Patent is hereby corrected as shown below:

Col. 18; In claim 27, line 20, please delete "25" and insert --26--.

Col. 18; In claim 28, line 23, please delete "25" and insert --26--.

Signed and Sealed this

Twenty-fourth Day of August, 2010

David J. Kappos
*Director of the United States Patent and Trademark Office*